United States Patent [19]

Barnard

[11] Patent Number: 5,680,323
[45] Date of Patent: Oct. 21, 1997

[54] MULTIMEDIA PLAYER

[75] Inventor: John D. Barnard, Orange, Calif.

[73] Assignee: Canon Information Systems, Inc., Costa Mesa, Calif.

[21] Appl. No.: 494,077

[22] Filed: Jun. 23, 1995

[51] Int. Cl.$^6$ .................................................. G06K 15/00
[52] U.S. Cl. .................. 364/514 A; 364/514 R; 395/153; 395/154; 395/157; 395/806
[58] Field of Search .................. 364/514 A, 514 C, 364/514 R; 395/153, 154, 157, 165, 806; 370/110.1, 522, 260

[56] References Cited

U.S. PATENT DOCUMENTS

| 5,428,730 | 6/1995 | Baker et al. | 395/154 |
| 5,457,780 | 10/1995 | Shaw et al. | 395/165 |
| 5,539,871 | 7/1996 | Gibson | 395/154 |
| 5,539,886 | 7/1996 | Aldred et al. | 395/153 |

Primary Examiner—Douglas W. Olms
Assistant Examiner—Shick Hom
Attorney, Agent, or Firm—Fitzpatrick, Cella, Harper & Scinto

[57] ABSTRACT

A method and apparatus for launching a multimedia player from an operating windowing application such that the multimedia player operates as a child window of the operating windowing application. The method and apparatus operate to launch the multimedia player in response to a user-selection of a predefined function in the operating windowing application, identify a main window within the operating windowing application from which the predefined function was selected, locate, within the main window, a target child window having both a specific class-type and a specific dimension, create, in the case that the child window is located, a playback window and overlaying the playback window onto the target child window, and play, within the playback window, a multimedia selection corresponding to the user-selected predefined function.

35 Claims, 10 Drawing Sheets

MULTIMEDIA PLAYER

BACKGROUND OF THE INVENTION

1. Field of the Invention

The present invention relates to a multimedia player application which appears to be integrated and controlled by an operating windowing application from which the multimedia player application was launched, all without having to modify the program of the windowing application, and, more particularly, the present invention relates to a multimedia player application which actively determines which windowing application has caused it to be launched and plays a multimedia selection in a playback window which is overlaid onto a visible window which has both a predefined class-type and a predefined dimension of the operating windowing application.

2. Description of the Related Art

Currently, there are many windowing application products which use interactive graphical user interface displays to launch independent multimedia windowing applications based on a user selection within the graphical user interface. However, these multimedia applications which are launched from operating applications do not operate within the environment or window of the operating application. In addition, the launched application does not react to changes in the operating application. For example, if the operating application is moved or re-sized, the launched application is not moved or re-sized. And, if the operating application is closed, the launched application may not close. Accordingly, if a user of a currently available windowing application wants to run another application from within the currently available windowing application, programmers of that application have to create an entirely new revision of the application so that the two applications are dependently integrated. For example, if a user wants to have multimedia capabilities in a word processing application, a multimedia application would have to be integrated into the word processing application.

Accordingly, there exists a need to be able to provide multimedia capabilities in an existing windowing application product without modifying the existing windowing application. Thus, it is desirable to be able to use currently existing windowing applications with a multimedia application to play animation, audio, or video clips which appear to be operating within the currently available application such that the use and the control of the multimedia application appear to be provided by the existing windowing application product and the launching and operation of the multimedia functions are transparent to the user.

SUMMARY OF THE INVENTION

These needs are addressed by the present invention by providing a multimedia player which can be adapted to operate within another windowing application so long as the windowing application has the capability of launching another independent application. According to the invention, the multimedia player is launched by an operating application and provides multimedia capabilities in such a way that the multimedia capabilities appear to be integrated into the operating application. That is, in a windowing application which can launch another program by a user selecting a button, a hot spot, or a hot word in the operating application, the multimedia player operates within a window of the operating application and functions within the windowing control of that window.

According to one aspect of the invention, the present invention is a method for launching a multimedia player from an operating windowing application such that the multimedia player operates as a child window of the operating windowing application. The method comprises the steps of launching the multimedia player in response to a user-selection of a predefined function in the operating windowing application, identifying a main window within the operating windowing application from which the predefined function was executed, locating, within the main window, a target child window having both a predetermined class-type and a predetermined dimension, creating, in the case that the child window is located, a playback window for playing a multimedia selection and overlaying the playback window onto the target child window, and running, within the playback window, a multimedia selection corresponding to the user-selected predefined function.

According to another aspect of the invention, the present invention is a multimedia player which plays a multimedia selection within an operating windowing application. The multimedia player comprises input means for inputting a user-selection of a windowing function, memory means for storing process steps and a multimedia player application, and process means for launching the multimedia player application within the operating windowing application in response to a user selecting a predefined windowing function using the stored process steps, wherein, upon being launched, the multimedia player application 1) identifies a main window within the operating windowing application from which the predefined function was executed, 2) locates, within the main window, a target child window having both a specific class-type and a specific dimension, 3) creates, in the case that the target child window is located, a playback window and overlaying the playback window onto the target child window, and 4) runs, within the playback window, a multimedia selection corresponding to the user-selected predefined function.

According to another aspect of the invention, the present invention is a computer program product comprised of a computer-usable medium having a computer-readable program code means embodied in the medium for causing a multimedia player to be launched within an operating windowing application. The computer program product comprises, a computer-readable program code means for causing a computer to launch the multimedia player upon a user selection of a predefined function in the operating windowing application, a computer-readable program code means for causing the computer to execute the multimedia player to a multimedia selection corresponding to the selected predefined function by 1) identifying a main window within the operating windowing application from which the predefined function was executed, 2) locating, within the main window, a target child window having both a specific class-type and a specific dimension, 3) creating, in the case that the child window is located, a playback window and overlaying the playback window onto the target child window, and 4) running, within the playback window, a multimedia selection corresponding to the user-selected predefined function.

DETAILED DESCRIPTION OF THE PREFERRED EMBODIMENT

Figure 1:
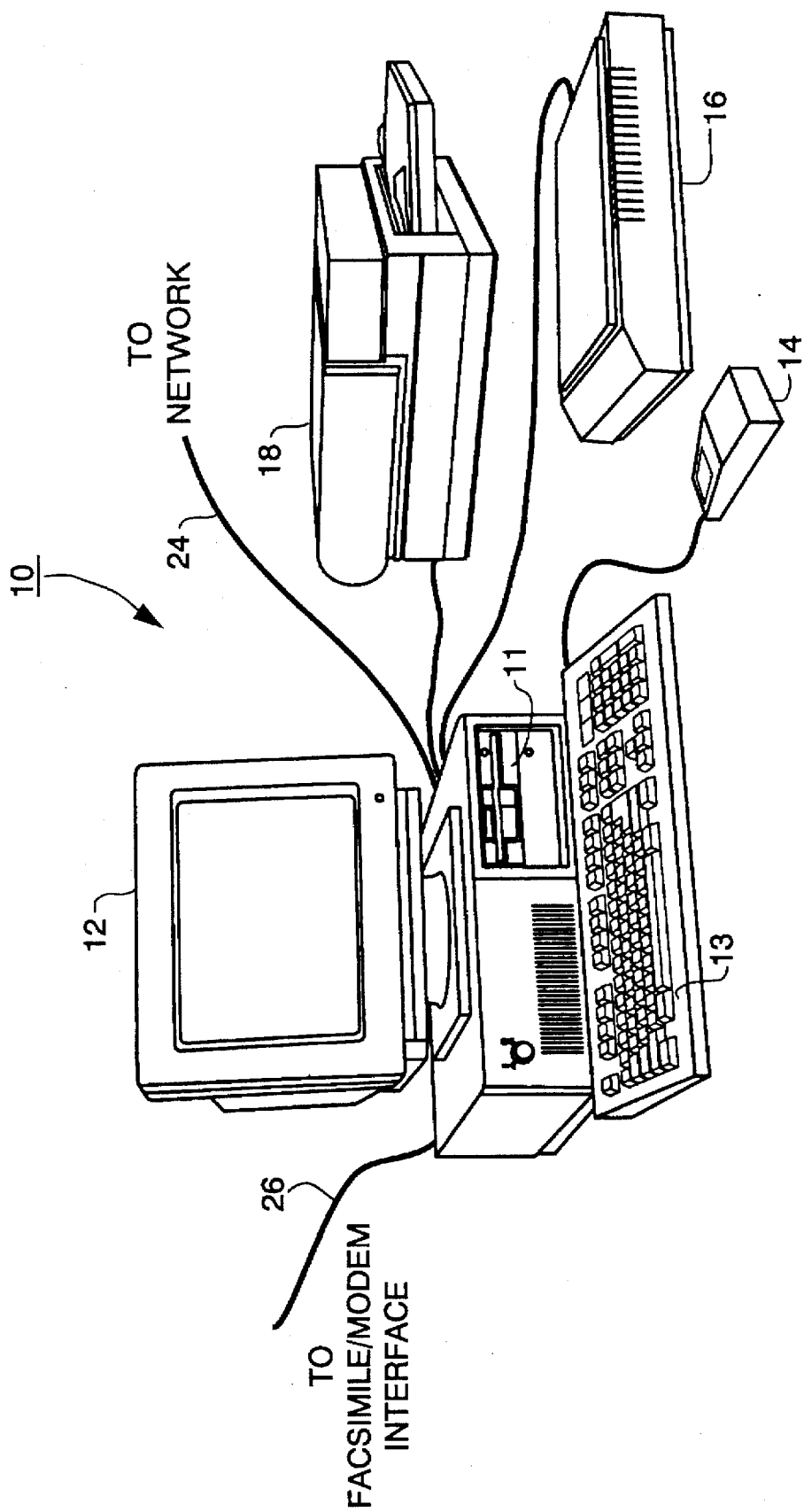
FIG. 1 is a perspective view showing the outward appearance of an apparatus according to the present invention.

FIG. 1 is a view showing the outward appearance of a representative embodiment of the invention. Shown in FIG. 1 is computing equipment 10, such as a Macintosh or an IBM PC or PC compatible computer having a windowing environment, such as Microsoft® Windows. In this regard, while the present invention will be described in connection with a Microsoft® Windows environment, it should be readily understood that the operation of the present invention could easily be modified to work in a Macintosh environment, X Windows environment, etc. Provided with computing equipment 10 is display screen 12, such as a color monitor or a monochromatic monitor, keyboard 13 for entering text data and user commands, and pointing device 14, such as a mouse, for pointing and for manipulating objects displayed on screen 12.

Computing equipment 10 includes a mass storage device such as computer disk drive 11 for storing data files which can include text files, image files, audio files, audio/video interlace files (AVI), etc., in compressed or uncompressed format, and for storing application program files which include Windows applications, DOS applications, and multimedia player 32. Alternatively, some or all of these applications can be stored on a network file server (not shown) accessible to computing equipment 10 via local area network interface 24. In addition, computing equipment 10 can include desktop publishing programs or other information processing programs which contain stored program instructions by which computing equipment 10 manipulates data files and presents data in those files to a user via the monitor.

Image data is input by scanner 16 which scans documents or other images and provides bitmap images of those documents to computing equipment 10. Data may also be input into computing equipment 10 from a variety of other sources such as network interface 24 or other external devices via facsimile/modem interface 26.

Printer 18 is provided for outputting documents processed by computing equipment 10.

Figure 2:
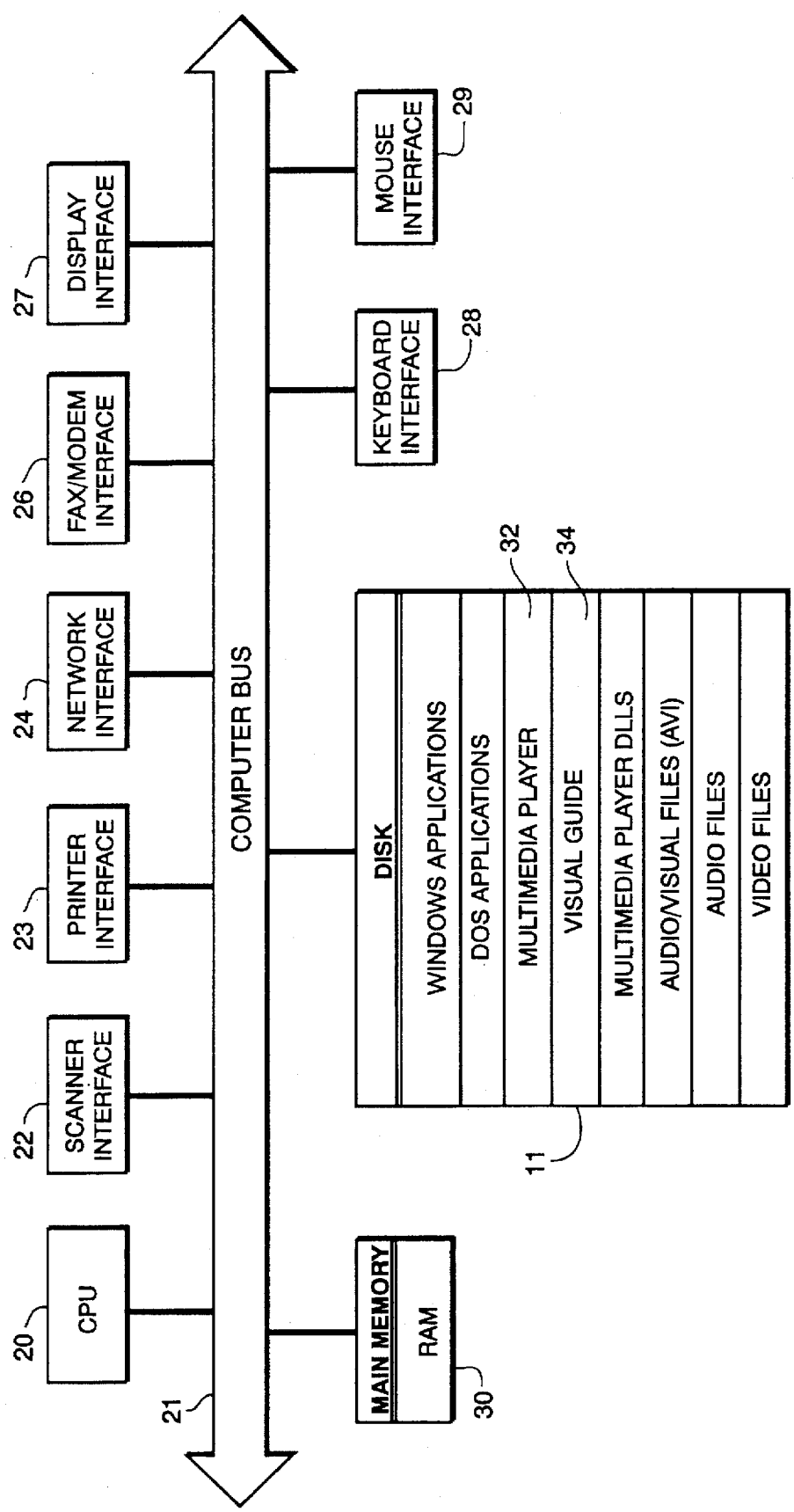
FIG. 2 is a block diagram of the FIG. 1 apparatus.

FIG. 2 is a detailed block diagram showing the internal construction of computing equipment 10. As shown in FIG. 2, computing equipment 10 includes a central processing unit (CPU) 20 interfaced with computer bus 21. Also interfaced with computer bus 21 is scanner interface 22, printer interface 23, network interface 24, fax/modem interface 26, display interface 27, keyboard interface 28, mouse interface 29, main memory 30, and disk 11.

Main memory 30 interfaces with computer bus 21 so as to provide random access memory storage for use by CPU 20 when executing stored application programs such as Visual Guide by Canon Inc. (hereinafter "Visual Guide 34") or any one of the windowing applications. More specifically, CPU 20 loads those program applications from disk 11 into main memory 30 and executes those stored programs out of main memory 30. In accordance with user instructions, stored applications programs are activated which permit processing and manipulating of data. For example, Visual Guide 34 may be executed by the user in order to present information about a particular product and service which is connected to computing equipment 10. Most typically, the applications stored on computer disk 11, including multimedia player 32, have been stored on disk 11 by downloading the application from a computer-readable medium such as a floppy disk or a CD-ROM.

Figure 3:
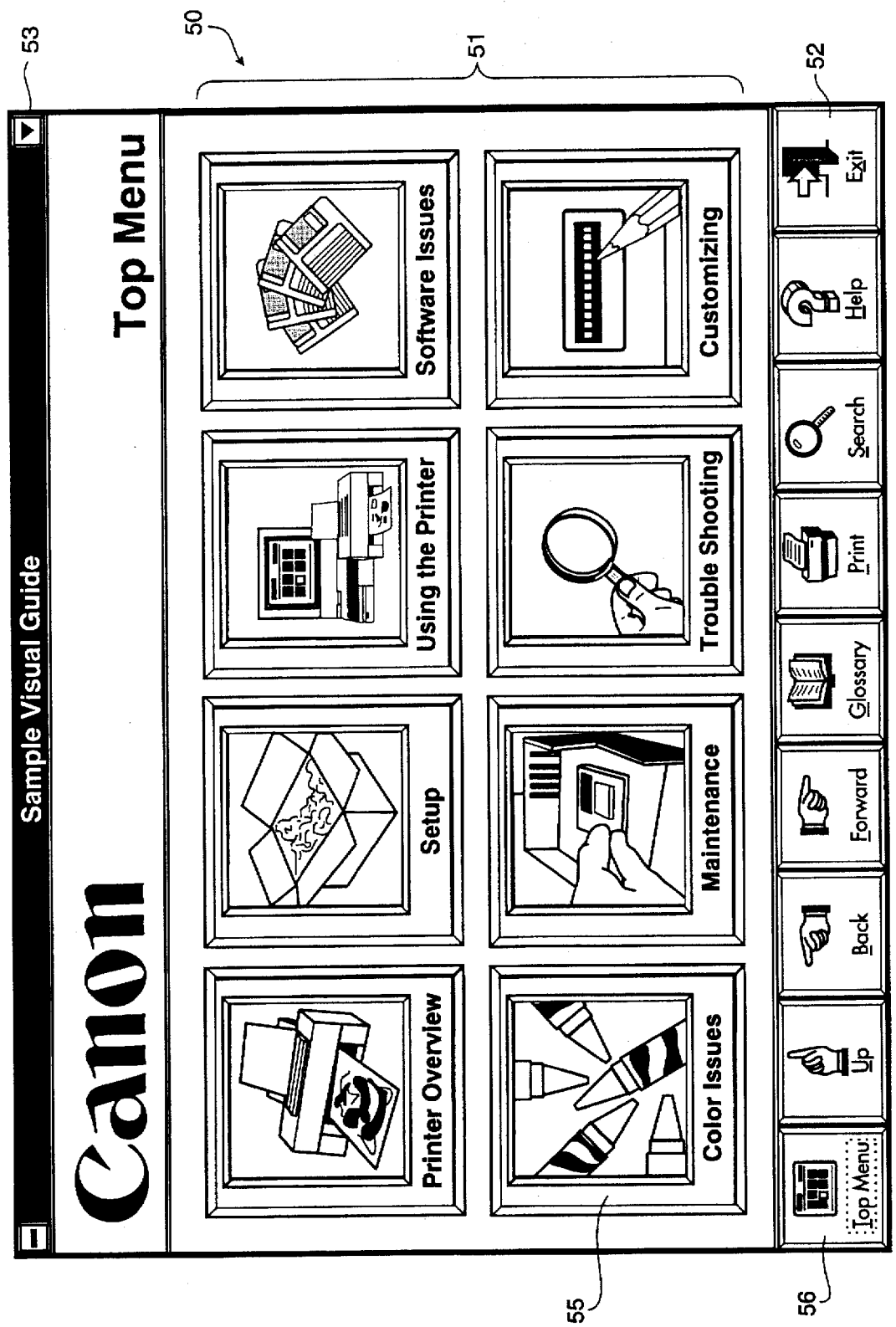
FIG. 3 is a representational view of a main menu graphical user interface display of an example of a windowing application from which the present invention can be launched.
Figure 4:
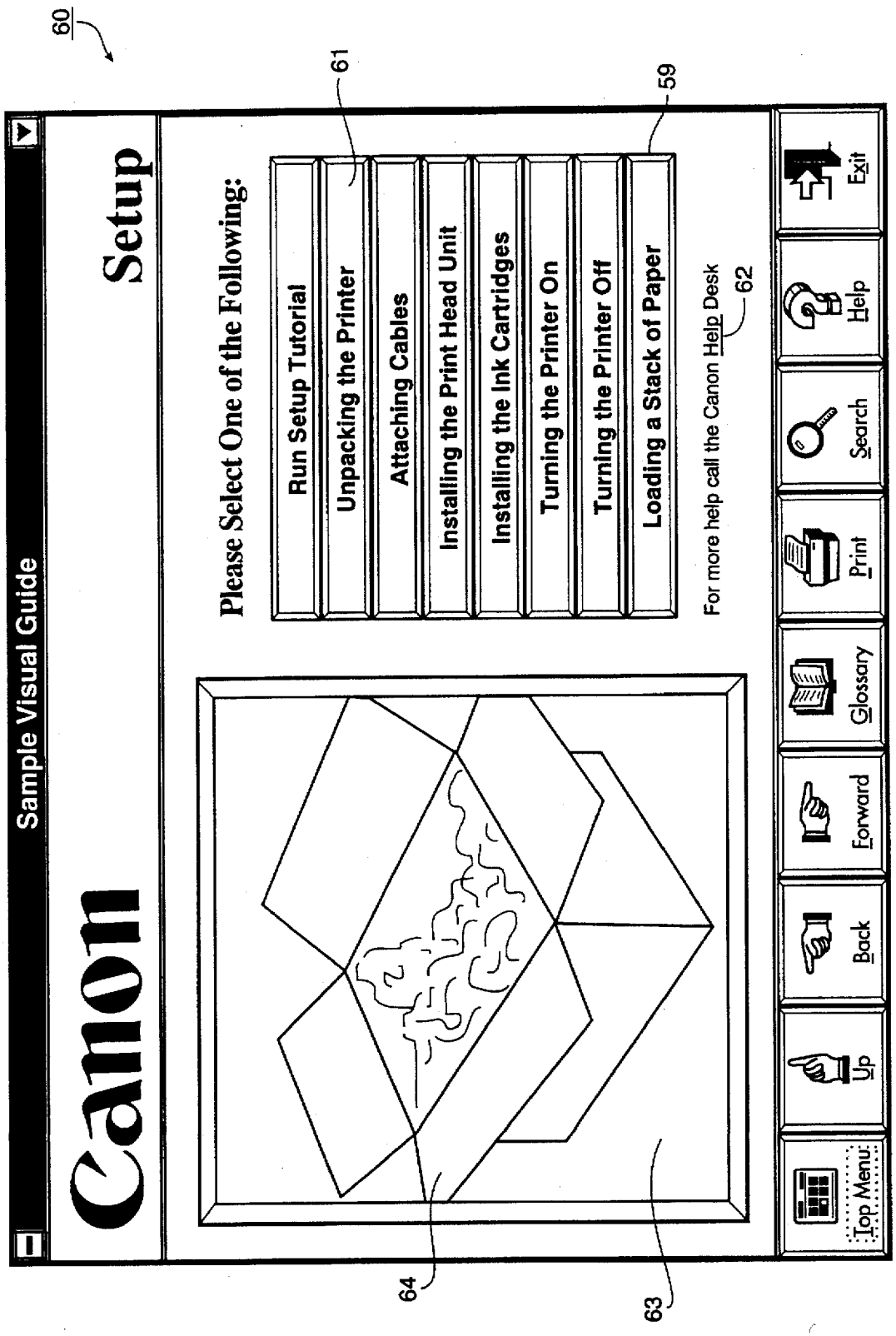
FIG. 4 is a representational view of a window onto which a playback window of the multimedia player is overlaid.
Figure 5:
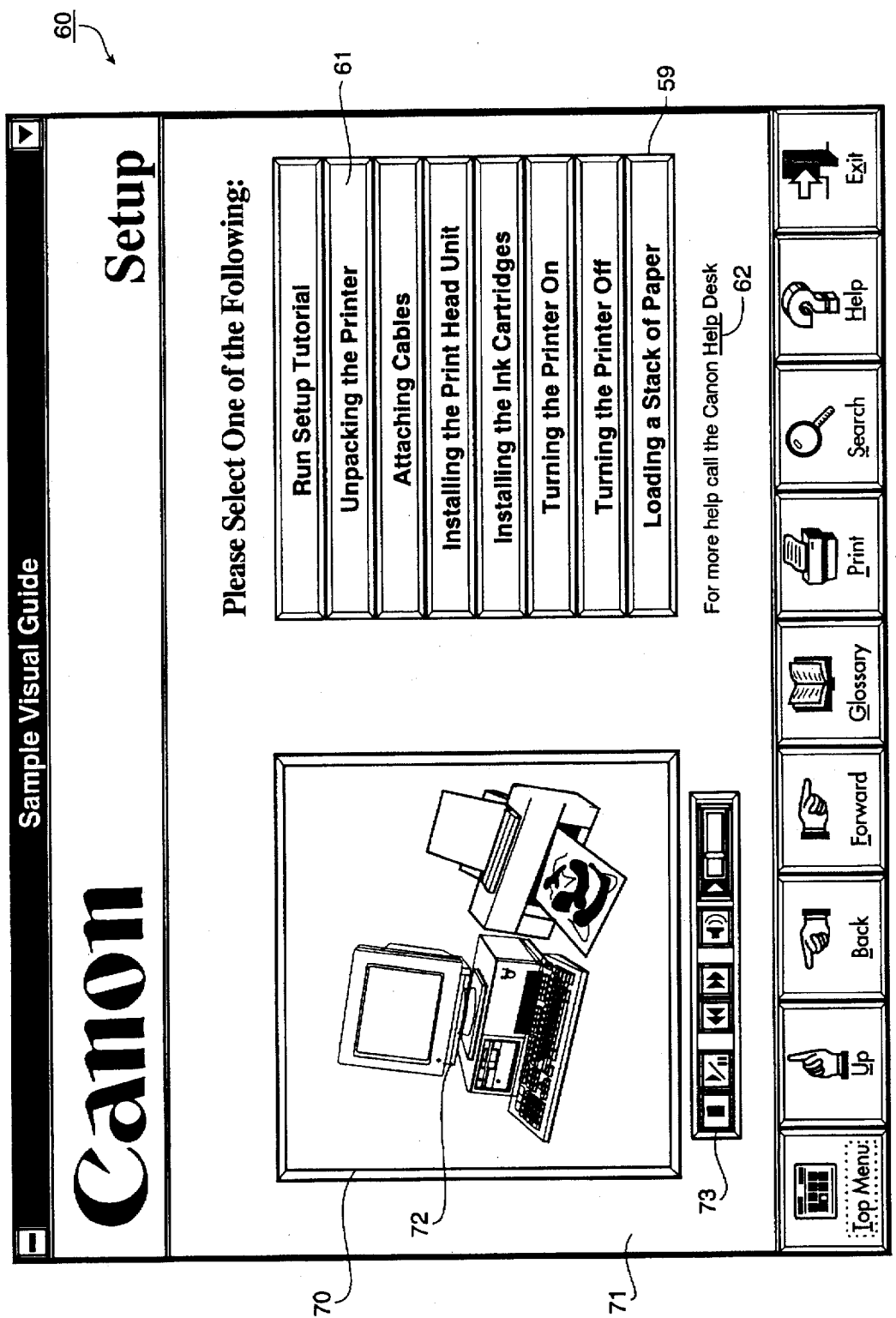
FIG. 5 is a representational view of a graphical user interface display which shows the multimedia player running a multimedia selection within a window of the operating application.

Now, a brief explanation will be provided with respect to FIGS. 3–5 as to how multimedia player 32 can be launched from a operating windowing application.

Initially, the present invention carries out three tasks. First, multimedia player 32 locates an operating application and determines whether the operating application is one in which multimedia player 32 can operate and, if so, locates the main window from which it has been launched. Upon finding the main window (FIG. 3), multimedia player 32 locates a target child window of the main window having a specific class-type and specific dimension (FIG. 4). Second, multimedia player 32 creates a playback window and overlays the playback window over the target window having the specific class-type and specific dimension and runs a multimedia selection within the created window (FIG. 5). And finally, multimedia player 32 monitors Windows messages which are being passed to the operating application by using conventional Windows message hooking functionality. A more detailed description of the foregoing operation will be provided below.

Multimedia player 32 will be described operating within Visual Guide 34 which is a windowing application produced by Canon Information Systems, Inc., however, it is to be understood that multimedia player 32 could operate within any conventional windowing application which has the ability to launch another application. Visual Guide 34 will be referred to throughout the remaining portion of the detailed description as an example of an "operating windowing application" from which multimedia player 32 is launched. In this regard, Visual Guide 34 is a windowing application which provides an on-line user's manual, via a computer interface, so that a user can access displayed information about a product or service such as instructions about setting up, using, maintaining and trouble shooting a peripheral device like printer 18 or scanner 16.

Multimedia player 32 is launched by executing a predefined function in the operating windowing application, Visual Guide 34, which is defined by the programmer of multimedia player 32. In the present example, upon execution of Visual Guide 34, top menu 50, shown in FIG. 3, is displayed to the user. From this window, a user can select any of eight icons to enter a specific chapter of Visual Guide 34. In this example, Setup icon 55 has been selected in FIG. 3. The selection of Setup icon 55 loads the "Setup" topic, which redraws display area 51 of top menu 50 so as to display topic menu 60, which includes a selection of setup topics and displays picture window 64, which includes an image representing a selected topic.

To launch multimedia player 32 from Visual Guide 34, a user selects a button, such as button 61, a hot spot, such as hot spot 63, or a hot word, such as "help" 62, within a graphical user interface of Setup window 60 displayed in FIG. 4. Upon clicking on of one of these functions, multimedia player 32 is launched.

Upon being launched, multimedia player 32 determines which operating application it should be responding to. In this regard, multimedia player 32 stores a main window class name and a target application name of the operating application it will respond to. The class name of the main window is compared to the class names of all main windows operating applications. More specifically, using Windows FindWindow function, the Windows class-type of the main window of Visual Guide 34 is located by multimedia player 32. Once the class-type of the main window name has been located, multimedia player 32 examines the task information for the main window in order to determine if it contains the name of the target application, i.e., Visual Guide 34. This is done by obtaining the task entry information of the main window which contains the name of the application to which the window belongs. Multimedia player 32 compares this information to its stored target application name. If it matches, the handle of the main window is saved by multimedia player 32.

At this point, it is also determined if Visual Guide 34 is displaying a specific child window having a specific class-type and a specific dimension. In the preferred embodiment, multimedia player 32 attempts to locate a child window having a specific class-type and having a dimension of 300×300 pixels. To accomplish this task, multimedia player 32 uses Windows EnumChildWindows function in order to enumerate and to identify all child windows of the main window. This function calls a callback function for each child window of the main window of Visual Guide 34. In the callback function, multimedia player 32 checks the child window's class-type and dimensions to determine if one of the child windows has both the specific class-type and dimension.

Finally, multimedia player 32 also determines if the "target" child window with the specific class-type and specific dimension is also visible and not currently hidden. Once it has been determined that the target child window with the specific type and specific dimension is visible, the handle of this target child window is saved for later use by multimedia player 32.

Upon locating the target child window (setup window 60), a playback window, indicated as playback window 70 in FIG. 5, is created and made a child window of child window 64 (setup). This is accomplished by using Windows SetParent function and by using both the stored handle of child window 64 as the parent and the handle of playback window 70 as the child. Because this also makes playback window 70 become a child window of Visual Guide 34, Visual Guide 34 cannot cover it, i.e., playback window 70 will stay on top of Visual Guide 34. Also, when Visual Guide 34 is moved around the screen (by standard Windows placement mechanism) playback window 70 will move with it.

Once the hook function is implemented, multimedia player 32 begins the playback of a multimedia selection corresponding to the user-selected feature. A multimedia selection can be an audio file, for example, WAV files, MIDI files, etc.; a visual file, for example, bitmaps, GIF, JPEG, etc.; or any combination of audio/visual files, for example, AVI files, Quicktime, MPEG, etc.

As mentioned previously, multimedia player 32 hooks into the normal messaging path between Windows Visual Guide 34 and by doing so monitors Windows messages sent to Visual Guide 34. To accomplish this task, multimedia player 32 uses the Windows SetWindowsHook function which sets up a callback function that is called each time a message is sent to Visual Guide 34. The callback function monitors and keeps track of all the messages being sent to the main and target child window of Visual Guide 34. When a message indicates one of the conditions under which playback should pause, resume or terminate, the hook function posts a message causing the playback to stop, resume or terminate. As a result, this prevents playback from occurring when it should pause. It also prevents playback from continuing when Setup window 60 has disappeared or Visual Guide 34 has been minimized or closed.

For example, playback of a multimedia selection should pause when the system menu of Visual Guide 34 is being displayed, i.e., the user clicks on the "menu" icon in the left corner of menu bar 56, or the user is pressing and holding down the left mouse button in title bar 53 of main menu window 50 to start a drag and move operation of the main window of Visual Guide 34. The playback of the multimedia selection should resume when the system menu disappears or the user releases the left mouse button after moving the Visual Guide window. Playback of a multimedia selection should terminate when the user does something that would normally cause a picture window to disappear. For example, by closing down the main window of Visual Guide 34, playback window 70 should terminate and close down as well.

Figure 7:
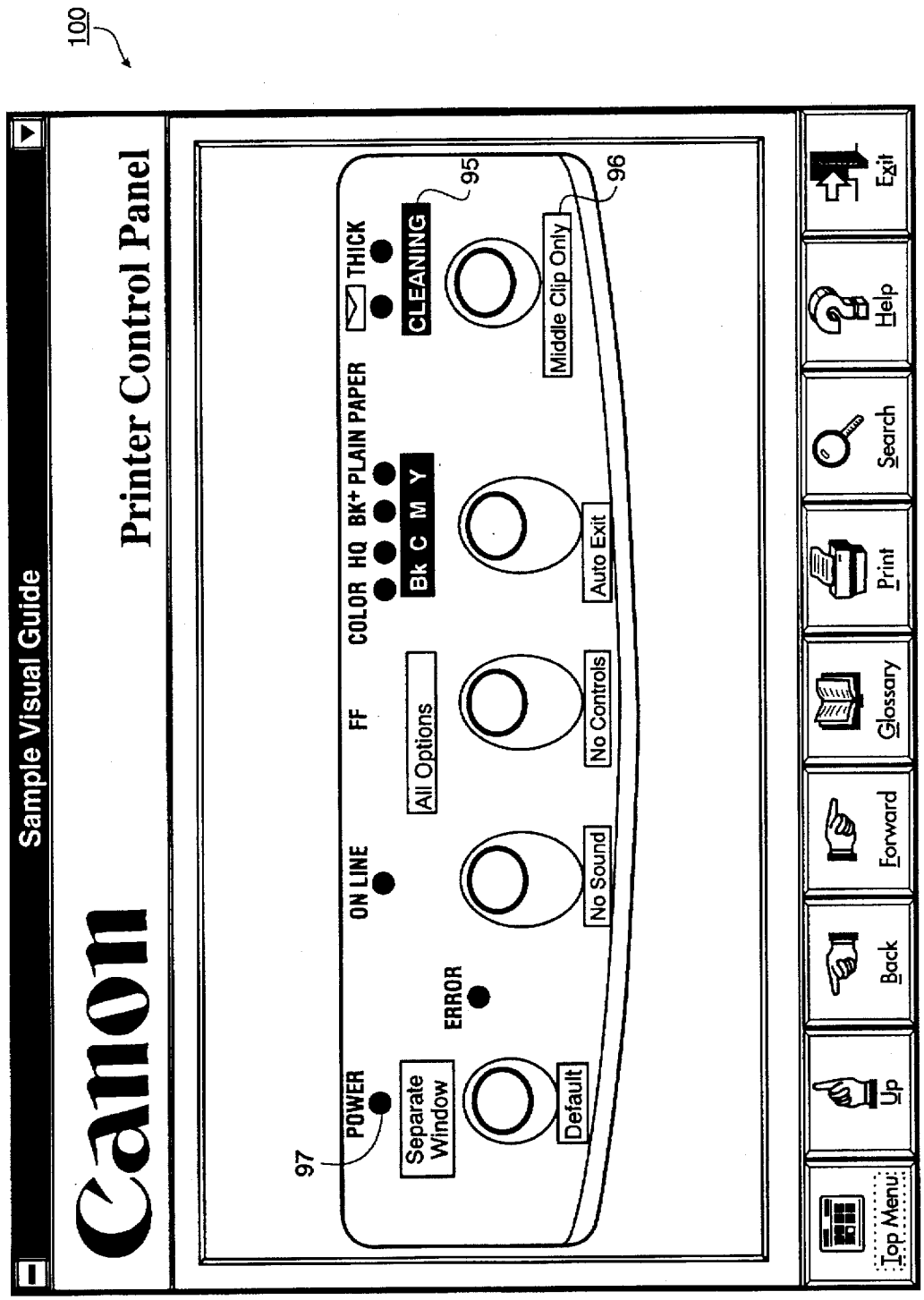
FIG. 7 is a representational view of a graphical user interface display which shows both hot spots and hot text from which the multimedia player of the present application can be launched.
Figure 8:
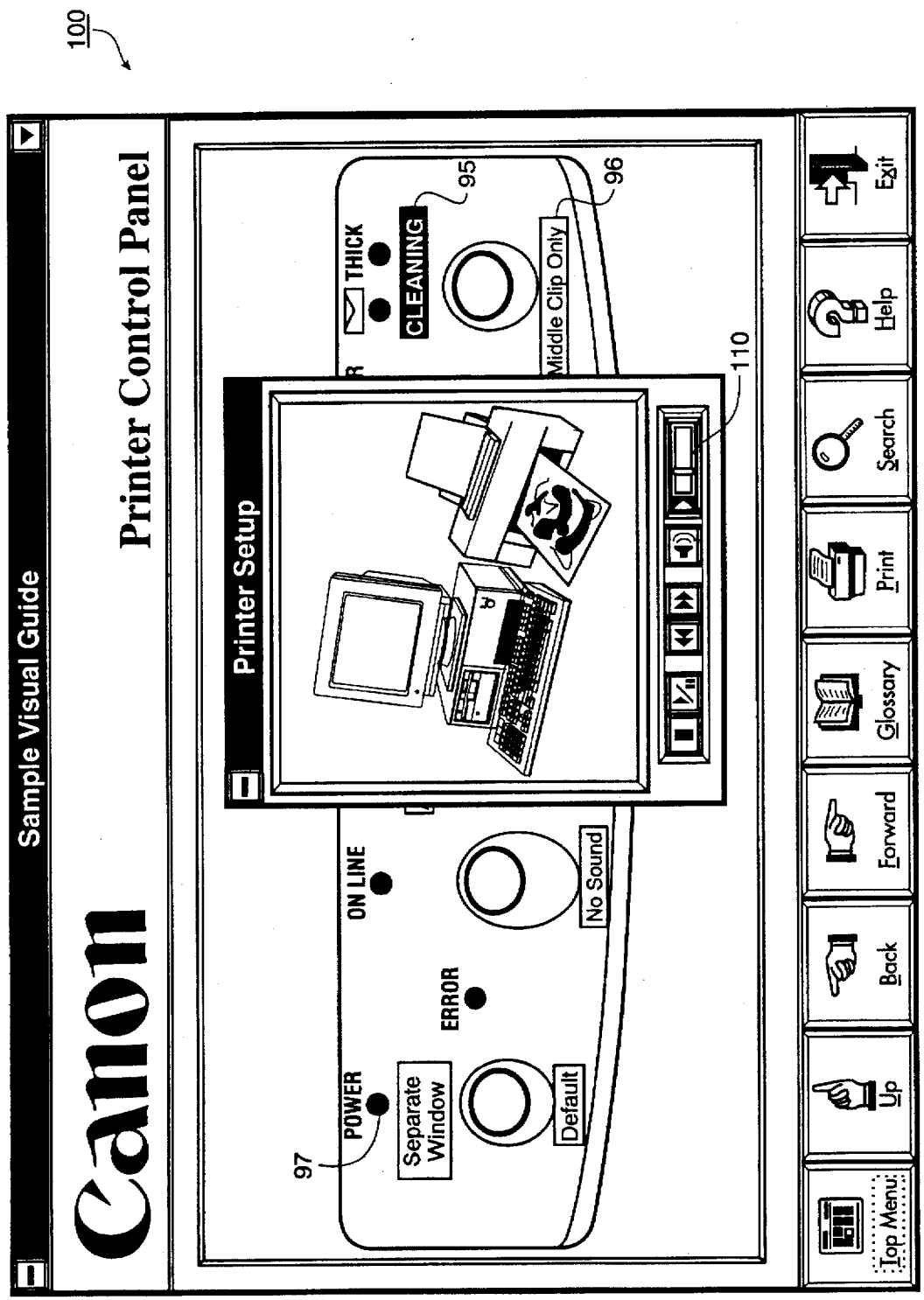
FIG. 8 is a representational view of the graphical user interface display in FIG. 5 in which a default window runs the multimedia selection.

The present invention also runs in a stand-alone or default window. That is, as shown in FIG. 8, there are occasions when a target window of a specific type and specific dimension are not provided by the operating application, but it is desirable to utilize the functionality of the multimedia player by playing back a multimedia selection. In such occasions, it is possible to use hot spots or hot words such as hot words 95 and 96 and hot spot 97 in printer control panel window 100 shown in FIG. 7. Upon executing one of the functions, multimedia stand-alone window 110 shown in FIG. 8 is overlaid over printer control panel window 100 using multimedia player 32. That is, in the case that the graphical user interface which is displayed does not include a target window having a specific class-type and a specific dimension, the playback of the multimedia selection will run independent of the operating application. This means that multimedia stand-alone window 110 will not move if the operating application is moved and will not exit if the topic changes or the operating application program is terminated. Furthermore, multimedia stand-alone window 110 will contain its own title bar and control panel and will move and re-size independently of the operating application.

A more detailed description of the functionality and operation of the present invention will be described hereinbelow with respect to the flow diagrams in FIG. 9A and 9B and with respect to FIGS. 3–8.

Figure 9A:
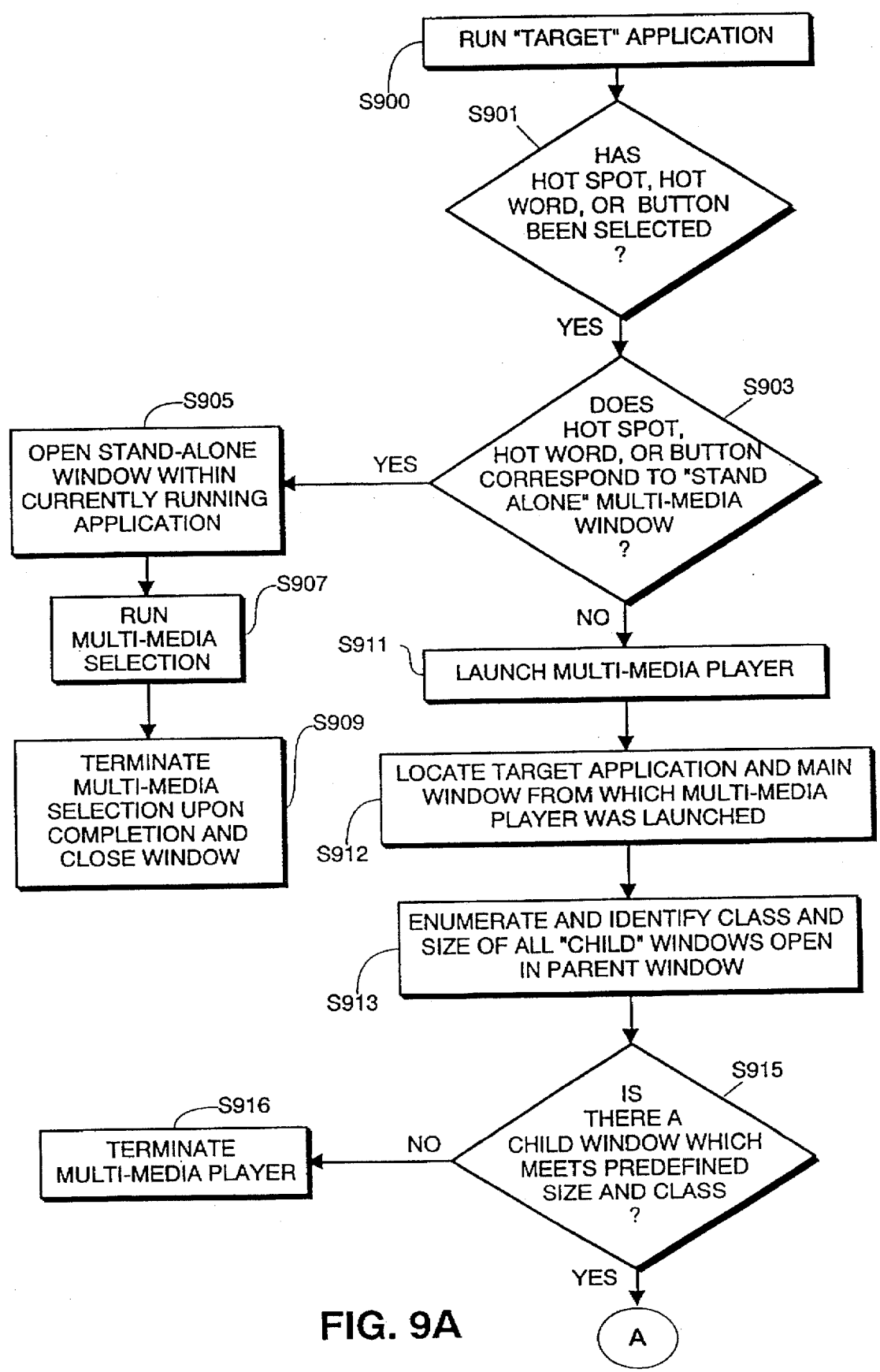
FIGS. 9A and 9B are flow diagrams describing how the multimedia player can be launched from a window of an operating windowing application.
Figure 9B:
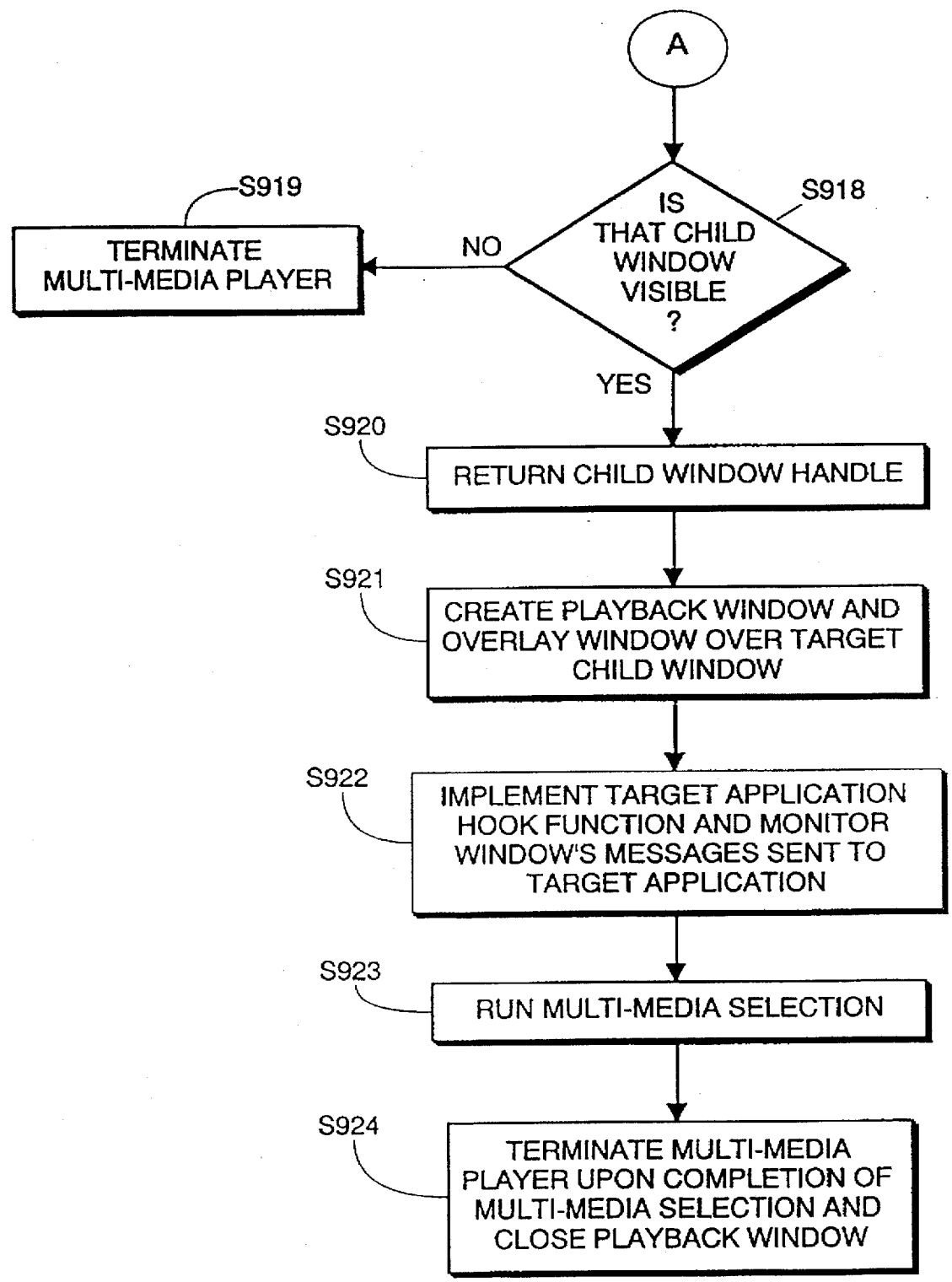

FIGS. 9A and 9B illustrate the method by which 1) the multimedia player 32 is launched, 2) the target application, main window and target child window are located, 3) a playback window is attached to the target window, and 4) Windows messages to the target application are monitored by multimedia player 32. These process steps shown in FIGS. 9A and 9B are executed by CPU 21 by loading various software programs of multimedia player 32 into main memory 30 and executing processing steps in those programs from main memory 30.

The process steps in FIGS. 9A and 9B illustrate the operation of CPU 21, which retrieves programs from disk 11, executes those programs, then in turn invokes other application programs which are caused to be launched by a user selecting a hot spot, button or word within a graphical user interface.

Now referring to FIG. 9A, in step S900, the target application, Visual Guide 34, is executed and, upon executing Visual Guide 34, main menu window 50 is displayed as shown in FIG. 3. From main menu window 50, the user selects one of the Visual Guide chapters such as the maintenance chapter, the troubleshooting chapter, the setup chapter, etc., by clicking on one of the displayed icons. In the present example, Setup icon 55 has been selected causing display area 51 to be redrawn to display Setup window 60 illustrated in FIG. 4. In this regard, tool bar 52 and title bar 53 remain the same and only display area 51 is redrawn any time a new chapter of Visual Guide 34 is selected.

As shown in FIG. 4, Setup window 60 is displayed to the user. Within Setup window 60, there are buttons, for example, "setup and installation" button 61; hot words, for example, "help", as indicated by reference numeral 62; and hot spots, for example, as indicated by reference numeral 63 within bitmap window 64. By clicking on any of the hot spots, buttons or hot words, multimedia player 32 can be launched.

Thus, in step S901, it is determined if any of the predefined hot spots, hot words or buttons have been selected in step S901. If, in step S901, a hot word, button or hot spot has been selected, it is determined in step S903 whether the hot spot, button or hot word corresponds to a multimedia stand-alone window. If the hot spot, button or hot word corresponds to multimedia stand-alone window 110, multimedia player 32 is executed and operates as an independent application. This is accomplished by sending a modified command to multimedia player 32 which indicates that it should run in a standalone fashion. In step S905, multimedia stand-alone window 110 is open on top of printer control panel window 100 as shown in FIG. 8.

Multimedia player 32 plays the multimedia selection corresponding to the selected hot spot, button or hot word and plays it through multimedia stand-alone window 110 in step S907. In step S909, the multimedia selection is terminated upon its completion and multimedia player 32 closes multimedia stand-alone window 110. As noted previously, the stand-alone window runs independently of Visual Guide 34 and can only be terminated by closing the default window and cannot be terminated simply by closing down Visual Guide setup window 60.

On the other hand, if the hot spot, button or hot word does not correspond to multimedia stand-alone window 110, then, in step S911, multimedia player 32 is launched. Upon being launched, multimedia player 32 locates the "target" application by finding a predefined main window class-type, which should be the main window from which the multimedia window has been launched. Typically, multimedia player 32 stores the predefined main window class-type and a listing of a target application from which it can be launched. To accomplish this task, multimedia player 32, using Windows FindWindow function, locates the main window of the target application by matching the stored predefined main window class-type.

In the present example, multimedia player 32 will have located the main window of Visual Guide 34 as the launching application. For example as shown in FIG. 3, the class-type of main menu window 50 would be located by multimedia player 32. Once the main window class-type has been identified, multimedia player 32 confirms that the main window belongs to the target application, Visual Guide 34. If confirmed, the handle of the main window is passed back to multimedia player 32 for storage and later use.

Once the main window of Visual Guide 34 has been located, multimedia player 32 determines if the main window is displaying a specific child window (target child window) having a specific class-type and a specific dimension. Preferably, the target child window has a dimension of 300×300 pixels. Thus, in S913, multimedia player 30 uses Windows EnumChildWindows function in order to enumerate and to identify child windows currently being displayed in the main window. This function calls a callback function for each child window of the main window. In the callback function, multimedia player 32 examines each child window's class-type and dimensions.

In step S915, multimedia player 32 determines if there is a child window which meets both the specific dimension and class-type. If a child window does not exist that has both the specific dimension and class-type, in step S916, the multimedia player 32 is terminated.

On the other hand, if it has been determined that such a target child window does exist, multimedia player 32 then determines if that child target window is visible in step S918. If the target child window does exist but is not visible, then in step S919, multimedia player 32 is terminated.

However, if it is determined that there is a child window that meets both specific class-type and dimension and it is determined that the target child window is also visible, multimedia player 32 saves the handle of that child window for later use (step S920).

Upon locating the target child window, picture window 64 in step S921, multimedia player 32 creates, in the present example, playback window 70, which is exactly the same dimension as the target window. For example, in the case that the target child window is a 300×300 pixel window, multimedia player 32 creates a 300×300 playback window. Upon creating playback window 70, multimedia player 32 overlays playback window 70 onto picture window 64 in Visual Guide 34 as shown in FIG. 5. Thus, as shown in FIG. 5, playback window 70 has been overlaid onto picture window 64, thereby effectively concealing it in step S921.

As mentioned above, playback window 70 is the same size as picture window 64. In this manner, playback window 70 totally conceals picture window 64 and, as a result, prevents, during the time playback window 70 is currently being displayed, the user from seeing what is being displayed therein. Accordingly, multimedia player 32 effectively conceals the images.

As shown in FIG. 5, playback window 70 consists of a border area 71, multimedia area 72, and playback control buttons 73. Border area 71 may vary in size so that multimedia area 72 can be defined as a standard size, although it cannot be larger than picture window 64, i.e., its parent window. In this manner, the specific characteristics, such as resolution, of multimedia area 72 can be predefined. As mentioned above, playback window 70 also includes playback control buttons 73. Playback control buttons 73 permit the user to control multimedia player 32 by using the control buttons. For example, as shown in FIG. 5, playback control buttons 73, from left to right, include a "close" button which when selected, causes multimedia player 32 to exit; a "play" button which when selected, causes a multimedia selection to start playing; a "review" button which when selected will back-up the multimedia selection; a "fast forward" button which when selected causes the multimedia selection to move forward quickly until the button is un-selected; a "sound-off" button which when selected turns sound off in the multimedia selection; a "sound-on" button which when selected turns sound on in the multimedia selection; and a "movie position" control slide button which indicates a current position in a multimedia selection relative to the beginning or the end, and allows the user to drag the control slide button in order to reposition the playback of the multimedia selection.

Figure 6:
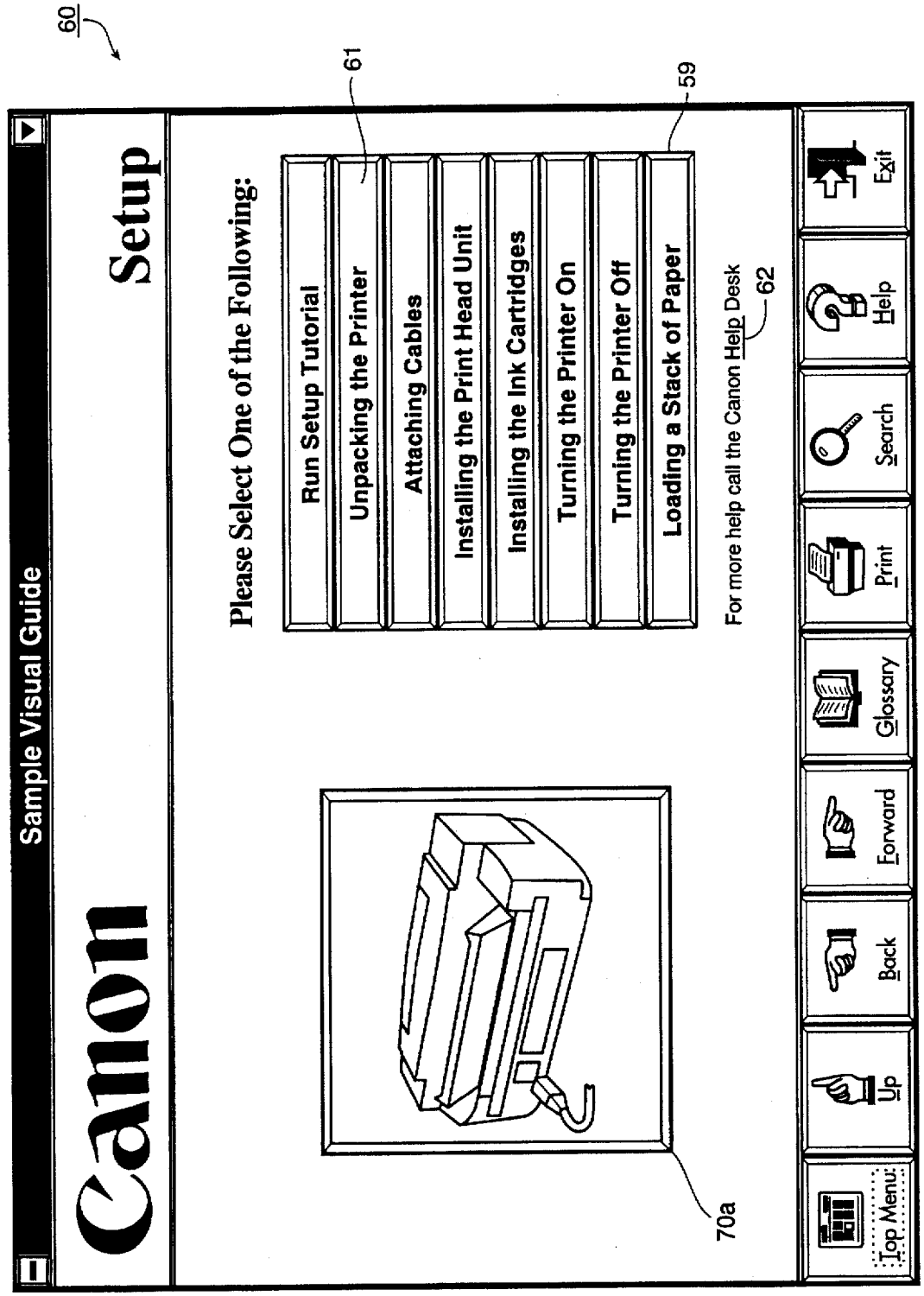
FIG. 6 is a representational view of a graphical user interface display which shows a variation of the multimedia player running a multimedia selection within a multimedia selection within a window of the operating application.

It is to be understood that playback window 70 may include all or some of the playback control buttons 73 discussed above. Optionally, playback window 70 may include no playback control buttons as shown in FIG. 6. Playback windows with or without playback control buttons may be provided as an option to the user in topic menu 59. For example, topic menu 59 may include topic hot buttons which indicate "unpacking the printer with playback controls" and "unpacking the printer without playback controls". Of course, having both types of functions is a design choice of the person using the multimedia player 32.

FIG. 6 shows playback window 70a which does not include playback control functions. In this regard, a multimedia selection is played without user control. Playback window 70a will also close upon the termination of the multimedia selection.

Simultaneous with creating and displaying playback window 70, multimedia player 32 implements a hook function (discussed previously) and monitors windows messages sent to Visual Guide 34 in step S922.

Upon completing the hook functions in step S923, the multimedia selection is played by multimedia player 32 and when the multimedia selection is completed, multimedia player 32 may close playback window 70 and exit Visual Guide 34 if the playback window does not contain playback control buttons 73 or if multimedia player 32 is launched with an automatic exit option. Otherwise, playback window 70 will be displayed until the user closes the window by clicking on the "close" control button, or playback window 70 will close when one of the conditions described previously, such as closing down the target application, occurs.

The invention has been described with respect to a particular illustrated embodiment. It is to be understood that the present invention is not limited to a multimedia player but may be any windowing application. In addition, various changes and modifications may be made by those of ordinary skill in the art without departing from the spirit and scope of the invention.

What is claimed is:

1. A method for launching a multimedia player from an operating windowing application such that a window of the multimedia player operates as a child window of the operating windowing application, the method comprising the steps of:

launching the multimedia player in response to a user-selection of a predefined function in the operating windowing application;

identifying a main window within the operating windowing application from which the predefined function was executed;

locating, within the main window, a target child window having both a specific class-type and a specific dimension;

creating, in the case that the target child window is located, a playback window of the multimedia player for playing a multimedia selection and overlaying the playback window onto the target child window such that playback window operates as a child window of the main window; and playing, within the playback window, a multimedia selection corresponding to the user-selected predefined function.

2. A The method according to claim 1, wherein, in the identifying step, the multimedia player compares a predefined class name of a main window class-type to all main windows of operating windowing applications, finds a main window matching the class name, examines the matching main window's task information for a predefined target application name, and stores, upon finding the predefined target application name, a window handle of the main window of the operating windowing application.

3. The method according to claim 1, wherein, in the locating step, a listing which includes window class-type and dimension of all child windows of the main window is retrieved by the multimedia player and is examined to determine if there exists a target child window having both a specific class-type and dimension.

4. The method according to claim 1, further comprising the step of determining whether the child window having the specific class-type and specific dimension is currently being displayed.

5. The method according to claim 4, further comprising the step of terminating execution of the multimedia player in the case a child window having both a specific class-type and dimension cannot be located or if the child window having both the specific class-type and dimension is determined not to be currently displayed.

6. The method according to claim 1, wherein, in the creating step, the multimedia player creates a playback window having at least a same dimension as that of the target child window, and causes the playback window to become a child window of the target child window.

7. The method according to claim 1, further comprising a monitoring step, which is implemented by the multimedia player, to monitor windowing messages between a Windows operating system and the operating windowing application.

8. The method according to claim 7, wherein the monitoring step further comprises the step of examining each windowing message sent to the operating windowing application, and determining if operation of the multimedia player should be altered based on a determination result in the determining step.

9. The method according to claim 1, wherein, in the playing step, the multimedia selection is an audio-video interlace (AVI) file.

10. The method according to claim 1, wherein, in the playing step, the multimedia selection is an audio/visual file.

11. The method according to claim 1, wherein, in the playing step, the multimedia selection is a visual file.

12. A multimedia player for playing a multimedia selection within an operating windowing application, comprising:

input means for inputting a user-selection of a windowing function;

memory means for storing process steps and a multimedia player application; and process means for launching the multimedia player application within the operating windowing application in response to a user inputting a predefined windowing function using the stored process steps, wherein the multimedia player application, upon being launched, 1) identifies a main window within the operating windowing application from which the predefined function was selected, 2) locates, within the main window, a target child window having both a specific class-type and a specific dimension, 3) creates, in the case that the child window is located, a playback window of the multimedia player and overlays the playback window onto the target child window such that the playback window operates as a child window of the main window, and 4) plays, within the playback window, a multimedia selection corresponding to the user-selected predefined function.

13. A computer program product comprising:
a computer-usable medium having a computer-readable program code means embodied in the medium for causing a multimedia player to be launched within an operating windowing application comprising:
   a computer-readable program code means for causing a computer to launch the multimedia player upon a user selecting a predefined function in the operating windowing application; and
   a computer-readable program code means for causing the computer to execute the multimedia player to play a multimedia selection corresponding to the selected predefined function upon 1) identifying the operating windowing application and a main window within the operating windowing application from which the predefined function was selected, 2) locating, within the main window, a target child window having both a specific class-type and a specific dimension, 3) creating, in the case that the target child window is located, a playback window of the multimedia player for playing a multimedia selection and overlaying the playback window onto the target child window such that the playback window operates as a child window of the main window, and 4) playing, within the playback window, a multimedia selection corresponding to the user-selected predefined function.

14. Computer-executable process steps stored on a computer-readable medium, the process steps to launch a multimedia player from an operating windowing application such that a window of the multimedia player operates as a child window of the operating windowing application, the process steps comprising:
   code to launch the multimedia player in response to a user-selection of a predefined function in the operating windowing application;
   code to identify a main window within the operating windowing application from which the predefined function was executed;
   code to locate, within the main window, a target child window having both a specific class-type and a specific dimension;
   code to create, in the case that the target child window is located, a playback window of the multimedia player for playing a multimedia selection;
   code to overlay the playback window onto the target child window such that playback window operates as a child window of the main window; and
   code to play, within the playback window, a multimedia selection corresponding to the user-selected predefined function.

15. The computer-executable process steps according to claim 14, wherein the code to identify includes code to compare a predefined class name of a main window class-type to all main windows of operating windowing applications, code to find a main window matching the class name, code to examine the matching main window's task information for a predefined target application name, and code to store, upon finding the predefined target application name, a window handle of the main window of the operating windowing application.

16. The computer-executable process steps according to claim 14, wherein the code to locate includes code to examine a listing which includes window class-type and dimension of all child windows of the main window to determine if there exists a target child window having both a specific class-type and dimension.

17. The computer-executable process steps according to claim 14, further comprising code to determine whether the child window having the specific class-type and specific dimension is currently being displayed.

18. The computer-executable process steps according to claim 17, further comprising code to terminate execution of the multimedia player in the case a child window having both a specific class-type and dimension cannot be located or if the child window having both the specific class-type and dimension is determined not to be currently displayed.

19. The computer-executable process steps according to claim 14, wherein, upon execution of the code to create, the multimedia player creates a playback window having at least a same dimension as that of the target child window, and causes the playback window to become a child window of the target child window.

20. The computer-executable process steps according to claim 14, further comprising code, which is implemented by the multimedia player, to monitor windowing messages between a Windows operating system and the operating windowing application.

21. The computer executable process steps according to claim 20, wherein the code to monitor further comprises code to examine each windowing message sent to the operating windowing application, and code to determine if operation of the multimedia player should be altered based on a determination result from the code to determine.

22. The computer-executable process steps according to claim 14, wherein, upon execution, the code to play plays a multimedia selection comprising an audio-video interlace (AVI) file.

23. The computer-executable process steps according to claim 14, wherein, upon execution, the code to play plays a multimedia selection comprising an audio-visual file.

24. The computer-executable process steps according to claim 14, wherein, upon execution, the code to play plays a multimedia selection comprising a visual file.

25. A computer-readable medium which stores computer-executable process steps to launch a multimedia player from an operating windowing application such that a window of the multimedia player operates as a child window of the operating windowing application, the computer-executable process steps comprising:
   a launching step to launch the multimedia player in response to a user-selection of a predefined function in the operating windowing application;
   an identifying step to identify a main window within the operating windowing application from which the predefined function was executed;
   a locating step to locate, within the main window, a target child window having both a specific class-type and a specific dimension;
   a creating step to create, in the case that the target child window is located, a playback window of the multimedia player for playing a multimedia selection and overlaying the playback window onto the target child window such that playback window operates as a child window of the main window; and a playing step to play, within the playback window, a multimedia selection corresponding to the user-selected predefined function.

26. The computer-readable medium according to claim 25, wherein, in the identifying step, the multimedia player compares a predefined class name of a main window class-type to all main windows of operating windowing applications, finds a main window matching the class name, examines the matching main window's task information for a predefined target application name, and stores, upon finding the predefined target application name, a window handle of the main window of the operating windowing application.

27. The computer-readable medium according to claim 25, wherein, in the locating step, a listing which includes window class-type and dimension of all child windows of the main window is retrieved by the multimedia player and is examined to determine if there exists a target child window having both a specific class-type and dimension.

28. The computer-readable medium according to claim 25, further comprising a determining step to determine whether the child window having the specific class-type and specific dimension is currently being displayed.

29. The computer-readable medium according to claim 28, further comprising a terminating step to terminate execution of the multimedia player in the case a child window having both a specific class-type and dimension cannot be located or if the child window having both the specific class-type and dimension is determined not to be currently displayed.

30. The computer-readable medium according to claim 25, wherein, in the creating step, the multimedia player creates a playback window having at least a same dimension as that of the target child window, and causes the playback window to become a child window of the target child window.

31. The computer-readable medium according to claim 25, further comprising a monitoring step, which is implemented by the multimedia player, to monitor windowing messages between a Windows operating system and the operating windowing application.

32. The computer-readable medium according to claim 31, wherein the monitoring step further comprises the step of examining each windowing message sent to the operating windowing application, and determining if operation of the multimedia player should be altered based on a determination result in the determining step.

33. The computer-readable medium according to claim 25, wherein, in the playing step, the multimedia selection is an audio-video interlace (AVI) file.

34. The computer-readable medium according to claim 25, wherein, in the playing step, the multimedia selection is an audio/visual file.

35. The computer-readable medium according to claim 25, wherein, in the playing step, the multimedia selection is a visual file.

* * * * *